Dec. 18, 1928.
T. R. HARRISON
1,695,424
WHEATSTONE BRIDGE METER SYSTEM
Filed March 26, 1925
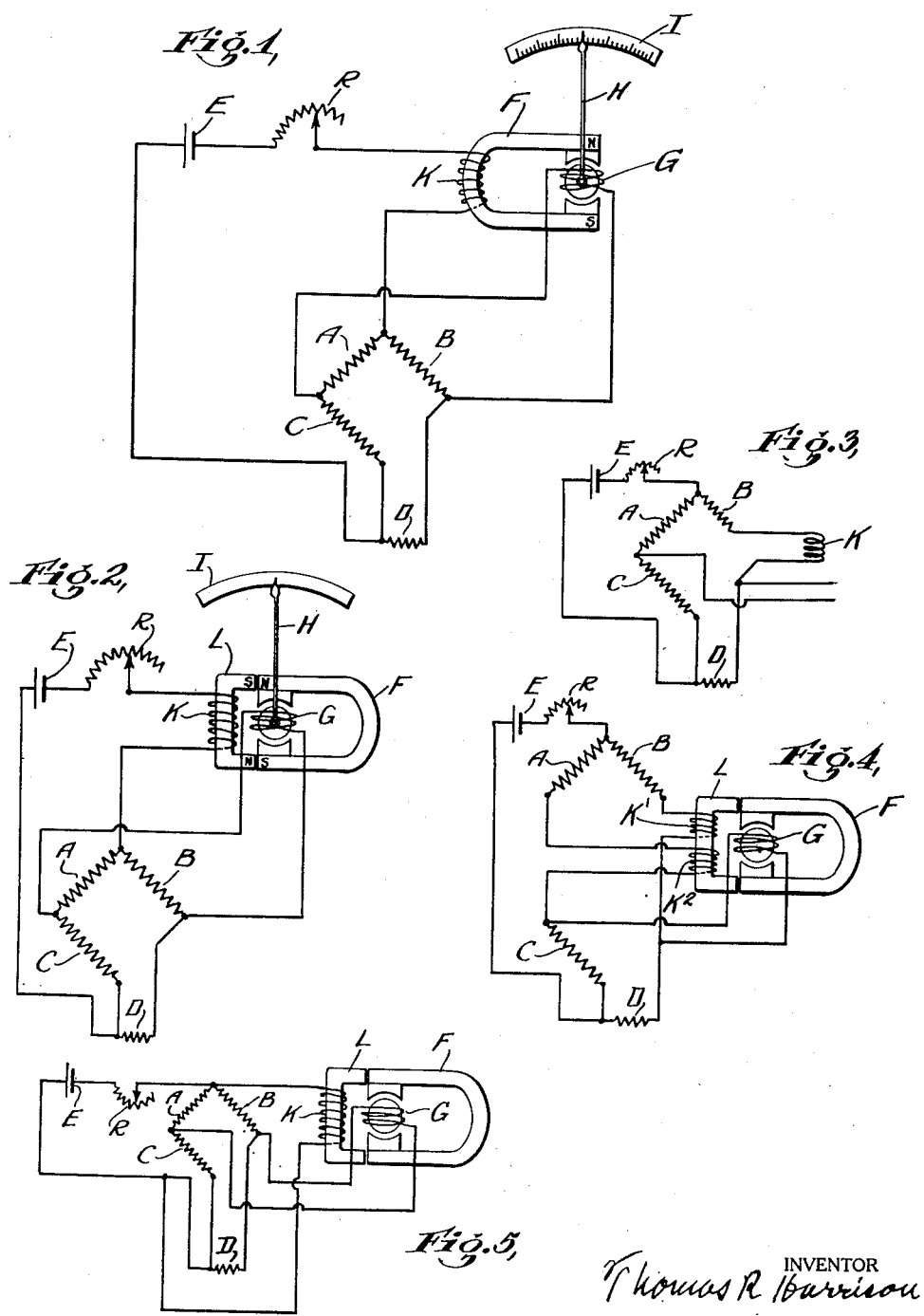

Patented Dec. 18, 1928.

1,695,424

UNITED STATES PATENT OFFICE.

THOMAS R. HARRISON, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

WHEATSTONE BRIDGE METER SYSTEM.

Application filed March 26, 1925. Serial No. 18,626.

My present invention relates to a meter system of the type comprising a Wheatstone bridge and a galvanometer arranged to indicate by the extent of its deflection the variations in value of the electrical quantity or quantities connected in and measured by means of the bridge and galvanometer.

In a meter system of this kind, a given value of the quantity measured will produce a definite and predetermined deflection of the galvanometer only in case the energizing current for the bridge is of a definite predetermined value. Variations in the strength of the bridge energizing current will produce corresponding variations in the galvanometer deflection obtained with a given value of the quantity measured.

In a measuring system of this type, the bridge is ordinarily energized by a dry cell or other battery source of current, the voltage of which ordinarily diminishes as the battery ages, though ordinarily not at a uniform rate, the diminution being more rapid in periods of use than in periods of nonuse, and the voltage may build up slightly in a period of nonuse following a period of use. The object of the present invention is to provide a measuring system of the type described with simple and effective provisions for automatically compensating the galvanometer for the changes in battery voltage to be expected in normal operation. To this end I provide means for subjecting the magnet of the galvanometer to a de-energizing or demagnetizing effect proportional to the strength of the battery current. In consequence, a change in the current flow through the winding of the galvanometer resulting from a decrease or increase, respectively, in the voltage of the bridge energizing source is attended, and to a substantial degree is compensated for by a simultaneous decrease or increase in the corresponding demagnetizing action on the magnet of the galvanometer.

The various features of novelty which characterize my invention are pointed out with particularity in the claims annexed to and forming a part of this specification; but for a better understanding of the invention, its advantages and specific objects attained with its use, reference should be had to the accompanying drawings and descriptive matter in which I have illustrated and described preferred embodiments of my invention.

Of the drawings:

Fig. 1 is a diagrammatic illustration of one embodiment of the invention; and

Figs. 2, 3, 4, and 5, are features each generally similar to, but each illustrating a different modification of the arrangement shown in Fig. 1.

In the arrangement shown in Fig. 1, A and B represent the usual ratio arms or resistances of a Wheatstone bridge, of which C represents the third known resistance arm, and D represents an unknown resistance the value of which is to be measured. E represents a dry cell or other battery source of current for energizing the bridge, one terminal of the battery being connected to the junction of the ratio arms A and B, while the other terminal is connected to the junction of the arms C and D. F represents the permanent magnet, and G the winding of a galvanometer the pointer H of which swings over a scale I. One terminal of the winding G is connected to the junction of the bridge arms A and C, and the other to the junction of the bridge arms B and D. In so far as above described, Fig. 1 presents nothing novel with me, but on the contrary shows a common and long used form of the type of measuring system which it is the object of the present invention to improve.

My improvement, in the form illustrated in Fig. 1, comprises a coil K connected in series with the battery E and the bridge, and arranged to exert a deenergizing effect on the magnet F. For this purpose the coil K, as shown in Fig. 1, is wound about the yoke of the magnet F, and is connected between the junction of the bridge arms A and B and the corresponding terminal of the battery cell E.

In operation the small and to be expected changes in voltage of the battery E produce corresponding fluctuations in the current flow through the galvanometer winding G and in the current flow through the deenergizing coil K. A decrease in current flow through the galvanometer winding G, due to a decrease in the voltage of the battery E, tends to produce a corresponding decrease in deflection of the galvanometer pointer H, but the simultaneous decrease in the demagnetizing effect of the coil K and resultant increase in the magnetic action of the magnet F on the winding G tends to produce an increased galvanometer deflection. By suitably proportioning the coil K relative to the characteristics of the magnet F and of the winding G, the effect of changes in voltage of the battery E on the deflection of the needle H produced by a given value of the resistance D, can be substantially minimized or eliminated through a relatively wide range of such battery voltage fluctuation.

To permit of an initial calibration of the system and recalibrations from time to time, a variable resistance R may be placed in the battery circuit, as shown, but this is not required to take care of the considerable variation in voltage of the battery E compensated for by the coil K.

The principle of the invention embodied in the arrangement shown in Fig. 1 can be employed in quite different forms of apparatus. For example, as shown in Fig. 2, the coil K instead of being wound on the magnet F to exert a direct demagnetizing effect on the latter, may surround a soft iron part L forming a permanent though variable magnetic shunt about the winding G. In this case the coil K and shunt L should be so arranged relative to the magnet that an increase in the current flow through the coil K will increase the magnetic lines of force passing between the poles of the magnet F which are diverted away from the winding G by the shunt L. This means that the magnetic shunt L should be energized by the coil K in such fashion that each pole of the magnet F and the adjacent polar portion of the shunt L should be of opposite polarity. The arrangement shown in Fig. 2 gives the same general operative results as the arrangement shown in Fig. 1, but possesses a special advantage over that of Fig. 1, in that the coil K of Fig. 2 has less effect on the permanency on the magnet F than does the coil K of Fig. 1.

In lieu of passing the entire battery current through the coil K as is shown in Figs. 1 and 2, only a portion of that current need be passed through the coil which for this purpose may be connected in one of the arms of the bridge, for example, as shown in Fig. 3, in the arm of the bridge of Fig. 1, or Fig. 2, containing the resistance B. The arrangement shown in Fig. 3 possesses an advantage over those shown in Figs. 1 and 2 in that the use of the coil K, illustrated in Fig. 3, does not add to the electromotive force which the battery E is required to furnish, while with the arrangement shown in Figs. 1 and 2, the use of the coil K makes it necessary for the battery E to furnish more electromotive force than would otherwise be required. The arrangements of Figs. 1 and 2 possess an advantage over the arrangement shown in Fig. 3 in that the bridge itself is independent of the coil K and its connections. In consequence of this fact, the arrangement shown in Fig. 3 is not adapted for use in connection with electrical gas analysis apparatus where-in the filament of the air cell would form all or part of the resistance of bridge arm B, while the filament of the gas cell would form all or part of the resistance of the bridge arm D; whereas the arrangements shown in Figs. 1 and 2 are well adapted for such use. The arrangements shown in Figs. 1, 2, and 3 are each well adapted, however, for use as pyrometers in which the resistance D may be the resistance bulb of a resistance thermometer, and for most other uses of this type of meter system.

In Fig. 4 the single coil K of Figs. 1, 2, and 3 is replaced by two coils K' and K², one in the bridge arm B and one in the bridge arm A. This arrangement combines the advantage of Figs. 1 and 2 in that the total battery current is used in the compensating winding surrounding the permanent magnet, or the magnetic shunt for the permanent magnet, with the special advantage of Fig. 3, that the demagnetizing compensating winding is within the bridge and does not add to the voltage which the battery E is required to furnish.

In the arrangement shown in Fig. 5 the demagnetizing winding K is connected to the battery cell E in shunt to the bridge. The effect of this is to locate the compensating winding outside of the bridge, as in Figs. 1 and 2, without increasing the voltage which the battery is required to furnish, but this arrangement increases the current which the battery must furnish.

While in accordance with the provisions of the statutes I have illustrated and described the best forms of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In a meter system comprising a Wheatstone bridge having two pairs of opposing arm junctions, a source of energizing current connected between the two junctions forming one of said pairs and a deflecting galvanometer connected between the other two junctions, the improvement which consists in a winding electro-magnetically associated with the galvanometer and energized by said source of energy and adapted to produce an effect on the galvanometer deflection opposite to that produced by the bridge as a result of fluctuations in the energizing current and in substantially constant proportion to the total flow of current through said bridge from said source.

2. The apparatus of claim 1 further characterized by the arrangement of said winding within the bridge, whereby the voltage which the source of energy is required to furnish is not increased by the use of said winding.

3. The apparatus of claim 1 further characterized by the division of said winding into two portions, one located in one, and the other in a second of the bridge arms.

4. The apparatus of claim 1 further characterized by an iron shunt magnetically short circuiting the galvanometer winding and subjected by the winding mentioned in claim 1 to a magnetizing action increasing its short circuiting action.

Signed at Philadelphia, in the county of Philadelphia, and State of Pennsylvania, this 21st day of March, A. D. 1925.

THOMAS R. HARRISON.